United States Patent Office 2,808,313
Patented Oct. 1, 1957

2,808,313

METHOD FOR THE PRODUCTION OF HIGH PURITY CAESIUM COMPOUNDS FROM CAESIUM-BEARING MINERALS

Herbert Julius Fleischmann, California, Ky., assignor to Michigan Chemical Company, St. Louis, Mich., a corporation of Michigan No Drawing. Application September 19, 1955, Serial No. 535,304

10 Claims. (Cl. 23—32)

This invention relates to a method for the preparation of highly purified forms of compounds of caesium from caesium-bearing minerals and more particularly to a method for the preparation of highly pure caesium compounds from minerals which contain caesium compounds in association with compounds of rubidium, potassium and other metallic elements.

Caesium is usually found in association with rubidium and potassium in the same mineral and usually forms a minor part of the metallic content of the mineral. Pollucite is the richest known caesium-bearing mineral and forms the principal source of caesium and its compounds. It is essentially a caesium aluminum silicate. A high grade pollucite ore may contain as much as about 32%, by weight, of caesium and often contains from a fraction of one percent to more than one percent of rubidium, along with potassium calcium, lead, iron and other elements, in addition to the aluminum and silicon which form a part of the primary compound of this mineral.

Caesium is difficult to separate from the rubidium and potassium with which it is usually associated in natural minerals. The purest caesium metal presently on the market contains at least 0.01%, by weight, of rubidium and approximately the same quantity of potassium. The purest commercially available caesium compounds contain corresponding percentages of rubidium and potassium.

Caesium is the most electropositive metal and will displace any other metal from its salt. It has a large atomic volume and does not readily alloy with other metals. Its salts have lower melting points than the corresponding salts of sodium and potassium. For these reasons, the salts of caesium, particularly the chloride and the fluoride, are quite valuable for use in the electrolytic production of other metals from their salts. However, to produce metals in a high state of purity by an electrolytic method using a caesium salt as an electrolyte, it is necessary that the caesium salt itself be in a highly purified state, since any metallic impurities which it contains will be deposited along with the desired metal.

Now, it is the object of this invention to provide a method suitable for use in the commercial production of compounds of caesium from caesium-bearing minerals, which are in such highly purified forms that other metallic elements therein can be detected only by delicate spectroscopic methods of analysis.

Another object of this invention is to provide a method for the production of purified compounds of caesium, from crude aqueous solutions of caesium chloride containing rubidium chloride, potassium chloride and water-soluble compounds of other metallic elements from which caesium is difficult to separate.

A further object is to provide compounds of caesium from which metallic caesium can be produced by electrolytic methods in grades of purity which have not heretofore been commercially available.

Still another object of this invention is to produce compounds of caesium in highly purified forms which render them suitable for use as molten baths for use in the production of other metals in states of high purity by electrolytic methods.

Other objects of this invention and its various advantageous features will become apparent from the detailed description of this invention which follows.

The method in accordance with this invention comprises the formation from a caesium-bearing mineral of a crude aqueous solution which is free of undissolved solids and which contains caesium chloride and hydrogen chloride, in association with water-soluble compounds of other metallic elements, usually including both rubidium chloride and potassium chloride. The caesium chloride in this solution is reacted with antimony chloride to form caesium antimony chloride which is insoluble in the crude acidic solution and precipitates therefrom. This caesium antimony chloride is separated from the crude solution.

The resulting caesium antimony chloride is suspended in an excess of pure water to cause its decomposition to caesium chloride which goes into solution and antimony oxychloride or antimony hydroxide, both of which are water-insoluble. The antimony separates as the antimony oxychloride at ambient temperatures, while the oxide is formed when the suspension is heated to an elevated temperature. The excess of water used in this step is in an amount, relative to the amount of the caesium antimony chloride, such that the hydrogen chloride produced by the decomposition of the caesium antimony chloride cannot reach a concentration in the aqueous solution at which the caesium antimony chloride is insoluble or, conversely, cannot reach a concentration at which caesium chloride and antimony chloride reacts to produce the caesium antimony chloride. The water-insoluble compound of antimony is separated from the aqueous solution of caesium chloride. The resulting solution of caesium chloride, now free of undissolved solids, contains hydrogen chloride, along with small percentages of salts of antimony and other metals, and is relatively pure as compared with the original crude solution produced from the caesium-bearing mineral.

The caesium chloride in the partially purified aqueous solution resulting from the foregoing antimony chloride purification step is reacted with perchloric acid to produce caesium perchlorate which crystallizes from the solution. The crystals of caesium perchlorate are separated from the solution, dried and heated to decompose the caesium perchlorate to caesium chloride. The resulting caesium chloride is so extremely pure that any contaminating metallic elements therein can be detected only by the most sensitive spectroscopic methods of analysis.

After the addition of the perchloric acid, I prefer to heat the solution after the formation of the caesium perchlorate crystals has started to almost, but not completely, dissolve those which have separated and then slowly cool the solution to a temperature near its freezing point. This causes the caesium perchlorate to crystallize in the form of white, needle-like crystals which are substantially, completely free of both chlorides and other metals, contains no water of crystallization and is relatively free of occluded water.

The caesium chloride produced by this method contains less than about ten parts per million of metaillic impurities. Aluminum is the only metallic impurity which can be detected by a standard spectroscopic analysis utilizing a sensitive photospectroscope having a range of 2,000 Angstrom units to 8,000 Angstrom units with the high dispersion of 2.5 Angstrom units per millimeter. By spectroscopic rechecks of the purity of this caesium chloride in which the photographic plate was over-exposed, the most persistent or so-called "last lines" of magnesium, silicon, copper and iron showed up quite faintly, in addition to the somewhat stronger aluminum lines.

This extremely pure caesium chloride can be converted to other compounds of caesium of equally high degrees of purity, as for example, by methasis with extremely pure reagents. Thus, it may be converted to high purity caesium fluoride by reaction in aqueous solution with highly purified silver fluoride followed by the separation of the precipitated silver chloride. Furthermore, this caesium chloride can be electrolyzed to produce metallic caesium of high purity. The high purity caesium chloride, caesium fluoride and metallic caesium resulting from this method make possible the economical production of other metals in states of high purity.

The antimony oxychloride or antimony oxide separated from the caesium chloride solution in the foregoing procedure is treated with concentrated hydrochloric acid to produce antimony chloride which is returned to the process and used to produce additional quantities of caesium chloride. Alternatively, the antimony oxychloride or antimony oxide can be reused, as is, without treatment with hydrochloric acid as stated above, inasmuch as the solution to which it is added in the process contains excess hydrochloric acid.

The crude solution containing caesium chloride is preferably prepared directly by the digestion of a caesium-bearing mineral, such as, for example, pollucite in concentrated hydrochloric acid. This procedure produces caesium chloride directly and results in a crude solution containing an excess of hydrogen chloride. As will be appreciated from the foregoing, the presence of free hydrochloric acid in the crude solution is necessary to the formation of the caesium antimony chloride.

This method is applicable to the preparation of pure caesium compounds from any caesium-bearing mineral. I prefer to treat pollucite in this process since it is the richest known caesium ore. However, I may utilize the method in the treatment of lepidolite which is essentially a complex lithia mica which contains small percentages of caesium, along with somewhat greater quantites of rubidium and other caesium-bearing minerals. Regardless of the particular caesium-bearing ore which I utilize, I grind it to a relatively fine particle size, for example, 50 mesh, before it is treated to produce a crude solution containing caesium.

Having now indicated the general nature of the method in accordance with this invention, I will now proceed with a detailed description of a preferred embodiment of the method by which caesium chloride in a state of high purity is produced from pollucite ore.

A pollucite ore is ground to a powder having a particle size which passed through a 50 mesh screen. The powdered ore is digested with an amount of hydrochloric acid within the range of about 0.5 part, by weight, to about 10 parts, by weight, for each part, by weight, of the ground pollucite ore. The hydrochloric acid used should have a concentration within the range of 3 N to 12 N. This digestion is carried out at an elevated temperature within the range of about 90° C. to about 108° C. for a period within the range of about 8 hours to about 20 hours. By heating with HCl and digesting at a moderate boil the germanium, arsenic, selenium, tellurium and boron escape as volatile chlorides and can be collected in a separate container thereby eliminating them as impurities from the solution. If these impurities are major in quantity they can be further processed and recovered. The crude solution remaining is then separated from the part of the pollucite which has failed to dissolve, as for example, by decantation followed by filtration. If the crude solution contains abnormal quantities of iron, the latter can be removed by an isopropyl ether extraction, in which case thallium and gold are also removed, if present.

The resulting crude solution may contain about 7.0%, by weight, to about 40.0%, by weight, of dissolved material. The percentage of caesium chloride contained in this crude solution depends upon the caesium content of the particular lot of pollucite ore which is digested and may, for example, fall within the range of about 5.0% to about 30 percent, by weight.

The crude solution containing caesium chloride, resulting from the digestion step normally contains an excess of uncombined hydrochloric acid. The amount of this excess is highly variable and is determined by the initial ratio of aqueous acid to ore utilized, the amount consumed in the formation of metallic chlorides and the amount which is lost by distillation during the digestion step. The hydrogen chloride content of this crude solution is adjusted by passing gaseous hydrogen chloride into the solution or by the addition of water, to give it a hydrogen chloride content within the range of 4 normal to 12 normal (saturated with hydrogen chloride). I prefer to utilize a hydrogen chloride concentration of about 5 normal.

Antimony chloride is added to this crude solution containing caesium chloride and the excess hydrochloric acid to form the double salt caesium antimony chloride which is insoluble in the aqueous hydrochloric acid and precipitates from the crude solution. The exact composition of this double salt is unknown. I believe it to be $CsSbCl_6$, although it may be $CsSbCl_5$ or a multiple thereof, $(CsSbCl_5)_x$. In any case its exact composition is immaterial and I shall refer to it as $CsSbCl_6$ hereinafter.

The amount of antimony chloride added to the solution is slightly in excess of the stoichiometric quantity required to form the antimony caesium chloride with all or substantially all of the caesium chloride present in the crude solution. Alternatively, I may add antimony oxychloride, antimony oxide, or a mixture thereof, or antimony metal to the crude caesium chloride solution and form antimony chloride in situ, while exercising the precaution of having the crude solution at least 3.0 N with respect to its hydrogen chloride content after the added antimony oxychloride, antimony oxide or metallic antimony is completely converted to antimony trichloride.

The caesium antimony chloride double salt precipitates from the crude solution containing hydrochloric acid in the form of coarse, yellowish brown crystals which are separated from the solution, as for example, by filtration or centrifuging, while exercising care to remove the excess mother liquor. The separated crystals of caesium antimony chloride may, if desired, be washed with a substantially saturated aqueous solution of hydrogen chloride to free it of clinging mother liquor.

The crystalline caesium antimony chloride is then suspended in an excess of water. The quantity of water used is within the range of about 10 parts, by weight, to about 200 parts, by weight, of the caesium antimony chloride crystals. The caesium antimony chloride decomposes in the water to produce caesium chloride, antimony oxychloride and hydrochloric acid at ambient temperatures, by the following reaction:

$$CsSbCl_6 + H_2O \rightarrow CsCl + SbOCl_3 + 2HCl$$

If desired, the suspension may be heated to an elevated temperature, for example, a temperature within the range of about 60° C. to about 100° C. At the elevated temperature the over-all reaction in the decomposition is as follows:

$$CsSbCl_6 + 5H_2O \rightarrow CsCl + Sb(OH)_5 + 5HCl$$

As indicated by this equation, the antimony separates from the solution as antimony hydroxide at the elevated temperature, rather than as the antimony oxychloride which is formed at ambient temperatures.

It will be noted that the decomposition of the caesium antimony chloride, either at ambient temperatures or at elevated temperatures releases hydrogen chloride. The water present must be in such excess that the concentration of the solution with respect to hydrochloric acid cannot rise to a normality at which the decomposition of the caesium antimony chloride ceases. The normality of the solution with respect to hydrochloric acid should not rise to 3 N and it is desirable to use an excess of water which keeps the maximum normality with respect to hydrogen chloride substantially below this maximum.

In carrying out this decomposition of the caesium antimony chloride it is desirable to keep the excess of water used to the minimum required to keep the concentration of hydrogen chloride below that at which the decomposition of the caesium antimony chloride is stopped, to avoid the production of an excessively dilute solution of caesium chloride in this step and the requirement of handling a large volume of liquid in the subsequent step. As a practical matter, I have found that this can be done by utilizing as an indicator the color change of the suspended solids from the yellowish brown of the caesium antimony chloride to the white of the antimony oxychloride or the antimony hydroxide. To accomplish this I suspend the caesium antimony chloride in a somewhat smaller quantity of water than the minimum required and then slowly add additional water, while agitating the suspension, until the color of the suspended solids in the solution has uniformly changed from yellowish brown to white.

The caesium chloride resulting from the decomposition of the caesium antimony chloride goes into solution, while the antimony oxychloride or antimony hydroxide, as the case may be, precipitates from the solution. By using this precipitated antimony compound to precipitate the caesium antimony chloride from strong HCl solution, as previously described, commercial quantities of extremely high purity antimony can be produced. The antimony oxychloride or antimony hydroxide is separated from this solution, as, for example, by filtration or centrifuging to yield a solution of caesium chloride and hydrogen chloride, which contains small quantities of antimony chloride and other impurities. This solution is relatively pure as compared with the original crude solution produced by the digestion of the pollucite.

Perchloric acid is then added to this aqueous solution of caesium chloride to cause the formation of caesium perchlorate which crystallizes from the solution. The perchloric acid may be added in substantially the stoichiometric amount theoretically required to react with all the caesium present. However, I prefer to add an excess of the perchloric acid to assure the reaction of all caesium present and I may add an excess as much as 300% of the stoichiometric quantity theoretically required for the reaction. Thereby the solution becomes so acid that only the most insoluble perchlorate salt, caesium perchlorate, precipitates, and all the other perchlorates remain in solution. Magnesium perchlorate can be used in place of perchloric acid, but in this case contaminants would precipitate with the caesium salt. The equation for this reaction is as follows:

$$CsCl + HClO_4 \rightarrow CsClO_4 + HCl$$

Crystals of caesium perchlorate start forming immediately upon the addition of the perchloric acid to the solution.

After the perchloric acid is added to the caesium chloride solution, it is heated until almost but not all of the caesium perchlorate crystals are dissolved. The maximum temperature to which the solution is heated is gauged by the amount of crystals suspended in it. In general it will be found that it is desirable to heat it to a temperature within the range of about 90° C. to about 100° C. This hot solution is then cooled very slowly, over a period of, for example, six to twenty-four hours to a temperature near its freezing point, for example, to about 0° C. to cause the formation of needle-like crystals of caesium perchlorate which are substantially completely free of occluded water, chlorides and of other metallic salts. These crystals are then separated from the solution by filtration or centrifuging and freed of mother liquor as completely as possible. These crystals may, if desired be washed with pure water, having a temperature near its freezing point or with perchloric acid at about the same temperature to remove all traces of mother liquor from them.

The separated crystals of caesium perchlorate are then air dried and slowly heated to decompose the caesium perchlorate to caesium chloride. The caesium perchlorate decomposes to produce caesium chloride according to the following equation:

$$CsClO_4 \rightarrow CsCl + 2O_2$$

In carrying out this heating step, I slowly raise the temperature of the perchlorate crystals to a temperature in excess of about 200° C. and prefer to continue to raise the temperature well above that point. I may, for example, carry it up to 646° C., the melting point of CsCl and actually melt the caesium chloride to drive off all residual material which is volatile at that temperature.

I have also found that extremely pure caesium fluoborate can be produced by using fluoboric acid in place of perchloric acid. In this case all the steps are identical to those described and which follow. For example, from 50 grams of caesium antimony trichloride I have produced 31 grams of caesium fluoborate using this procedure. This caesium fluoborate salt is without further conversion of great value as an electrolyte for the production of tantalum, columbium, titanium, zirconium, hafnium, thorium, molybdenum, tungsten, scandium, yttrium, vanadium, chromium, magnesium, calcium, strontium, radium, silicon, barium and the rare earth metals.

The embodiment of my method utilizing the perchloric acid precipitation step is specifically illustrated by the examples which follow:

EXAMPLE I

*Preparation of caesium chloride*

Twenty-two pounds of pollucite ore which contains about 6.0%, by weight, of caesium was ground to a particle size of 50 mesh and 30 pounds of concentrated analytical reagent grade hydrochloric acid containing 36.8%, by weight, of hydrogen chloride were charged into a 76 liter glass flask, provided with agitation and an open vertical condensation column topped by a water-cooled condenser which drained into a receiver. The flask was seated in a heating mantle. The contents of this flask was continually agitated and heated in a period of two hours from a starting temperature of 28° C. to a temperature of 94° C. at which temperature the solution began to boil. The boiling was continued for 18½ hours and a total condensate of about four liters was recovered in the receiver from the water-cooled condenser. The contents of the 76 liter flask was permitted to cool to about 75° C. and filtered under vacuum created by a steam jet through a Nutsche ceramic filter. The filtrate was passed through the filter a second time to secure complete clarification and the filter cake was then washed with the condensate recovered in the receiver, and the washing liquor added to the filtrate. The 76 liter flask was thoroughly cleaned and the filtrate returned to it. Three pounds of antimony trichloride were added to the filtrate, stirred thoroughly and then allowed to stand overnight. The suspension was then filtered and the filter cake washed with ten pounds of 6 N hydrochloric acid. This filter cake was caesium antimony chloride and was yellowish brown in appearance. This filter cake was suspended in distilled water in a 76 liter flask and additional distilled water added to the flask while the suspension was being agitated, until all solids in the suspension were entirely white in appearance. This precipitation was carried out at ambinet temperature. The suspension was then filtered and the filter cake of antimony oxychloride saved for use in the production of another batch by this method. The filtrate was returned to the 76 liter flask and five pounds of a 70–72%, by weight, aqueous solution of perchloric acid was slowly added to the filtrate while it was being agitated. The resulting crystal slurry was then heated to raise its temperature to the point at which the crystals had almost, but not completely dissolved in the solution. This had occurred by the time the temperature had reached approximately 95° C. The solution was then cooled very slowly to a temperature of about 3° C. over a period of approximately twelve hours. During this cooling period the caesium perchlorate had crystallized in the form of white needle-like crystals which were readily filtered and permitted the free drainage of mother liquor. The crystals were then dried at 110° C. for about 3 hours, then at 150° C. for sixteen hours and again at 110° C. for sixteen hours. The dried crystals weighed 994 grams and represented a 6% recovery of caesium oxide from the ore. These crystals were slowly heated to a temperature of about 650° C. to decompose the caesium perchlorate to caesium chloride and to melt the resultant caesium chloride. The yield of caesium chloride was 719 grams. Spectroscopic analysis of this product showed that it contained less than 0.001 percent, by weight, of other metals. Aluminum was the only metallic impurity revealed by a standardized spectroscopic analytical procedure.

The high purity caesium chloride prepared in this manner is highly valuable for use in the production of metallic caesium in a state of high purity. It is an excellent electrolyte for use in the production of other metals in highly pure states and it can be readily converted to other highly pure caesium salts. Thus, high purity caesium fluoride may be prepared by dissolving caesium chloride prepared by this method in a minimal quantity of water. For example, about 5 parts, by weight, to about 100 parts, by weight, of the caesium chloride may be dissolved in 100 parts, by weight, of water. This solution is then treated with the exact stoichiometric quantity of silver fluoride or preferably slightly less than the stoichiometric quantity, in a concentrated aqueous solution, to form caesium fluoride and cause the precipitation of silver chloride in accordance with the equation:

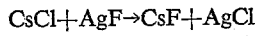

$$CsCl + AgF \rightarrow CsF + AgCl$$

An excess of distilled water, for example, about 5 parts, by weight, to about 20 parts, by weight, per part by weight of the suspension, is then added and the precipitated silver chloride separated from the solution by filtration. The caesium fluoride is then recovered by evaporating the filtrate to dryness. The recovered caesium fluoride, like the caesium chloride from which it was made, is highly pure.

From the foregoing it will be understood that the method in accordance with this invention, in providing a method for producing a caesium chloride in an extremely pure state, provides basis for the production of a wide variety of other caesium compounds of high purity. The production of one of these compounds, caesium fluoride, has been specifically exemplified for the reason that this particular compound in molten form, is particularly useful as an electrolytic bath for use in the production of other metals. When it is in a highly pure form, it makes possible the production of all other metals in highly purified forms by electrolytic methods. Caesium fluoride is extremely valuable as an electrolytic bath, not only because of the fact that caesium is the most electropositive and has the largest atomic volume of all metals, but also due to the facts that fluorine is the most electronegative of all elements, caesium fluoride has a relatively low melting point as compared with the comparable sodium and potassium compounds and has a tendency to form double salts with other metallic compounds.

Further, it will be understood that by providing a method for the production of an extremely pure form of caesium chloride, this invention provides an efficient and relatively simple method for the production of extremely pure metallic caesium by the electrolysis of the caesium chloride. The pure metallic caesium, in turn, is adapted for the production of other metals in pure forms by its reaction to displace them from their pure salts.

From the foregoing, it will also be readily apparent to those skilled in the art that the purification process in accordance with this invention can be modified in a variety of ways. Such modification has been exemplified in the foregoing by the alternative use of antimony chloride, antimony oxychloride and metallic antimony in the first of the two steps of the method has been specifically. Many other modifications in the method can be made without departing from the spirit of this invention.

While I have given specifically exemplified the practice of my method, it will be understood that this specific exemplification is for the purpose of illustration, and that various modifications and changes can be made in this specific procedure without departing from the spirit of my invention or the scope of the following claims.

I claim:

1. A method for the production of caesium chloride in a state of high purity which comprises the successive steps of forming an impure solution containing caesium chloride, other water-soluble metallic compounds and hydrochloric acid from a caesium-bearing mineral, reacting the caesium chloride in the solution with antimony chloride to produce a precipitate of caesium antimony chloride, separating the caesium antimony chloride from the impure solution, suspending the caesium antimony chloride in water to cause it to decompose to form caesium chloride and a water-insoluble compound of antimony, removing the antimony compound from the solution of caesium chloride, reacting the caesium chloride with perchloric acid to produce crystals of caesium perchlorate, separating the caesium perchlorate crystals from the said solution, and decomposing the caesium perchlorate to produce caesium chloride of high purity.

2. A method for the production of caesium chloride in a state of high purity which comprises the successive steps of digesting a caesium-bearing ore in an excess of concentrated hydrochloric acid to produce an aqueous solution containing caesium chloride, hydrochloric acid and other water-soluble compounds, reacting the caesium chloride in the solution with antimony chloride to produce a precpitate of caesium antimony chloride, suspending the caesium antimony chloride in water having a temperature below about 60° C. to cause the decomposition of the caesium antimony chloride to caesium chloride and antimony oxychloride, separating the antimony oxychloride from the solution of caesium chloride, reacting the caesium chloride with perchloric acid to produce caesium perchlorate, separating caesium perchlorate crystals from the solution and heating the caesium perchlorate crystals to an elevated temperature to cause them to decompose to caesium chloride.

3. A method for the production of caesium chloride in a stage of high purity which comprises the successive steps of digesting a caesium-bearing ore in an excess of concentrated hydrochloric acid to produce an aqueous solution containing caesium chloride, hydrochloric acid and other water-soluble compounds, reacting the caesium chloride in the solution with antimony chloride to produce a precipitate of caesium antimony chloride, suspending the caesium antimony chloride in water having a temperature above about 60° C. to cause the decomposition of the caesium antimony chloride to caesium chloride and antimony hydroxide, separating the antimony hydroxide from the solution of caesium chloride, reacting the caesium chloride with perchlooric acid to produce caesium perchlorate, separating caesium perchlorate crystals from the solution and heating the caesium perchlorate crystals to an elevated temperature to cause them to decompose to caesium chloride.

4. A method for the production of caesium chloride in a state of high purity which comprises the successive steps of forming an impure solution containing caesium chloride, other water-soluble metallic compounds and hydrochloric acid from a caesium-bearing mineral, reacting the caesium chloride in the solution with antimony chloride to produce a precipitate of caesium antimony chloride, separating the caesium antimony chloride from the impure solution, suspending the caesium antimony chloride in water to cause it to decompose to form caesium chloride and a water-insoluble compound of antimony, removing the antimony compound from the solution of caesium chloride, reacting the caesium chloride with perchloric acid to produce crystals of caesium perchlorate, separating the caesium perchlorate crystals from the said solution, heating the solution and the crystals of caesium perchlorate suspended therein to cause the crystals to almost but not completely dissolve in the solution and then cooling the solution very slowly to a temperature near its freezing point, separating the crystals of caesium perchlorate from the solution and slowly heating them to decompose the caesium perchlorate to caesium chloride.

5. A method for the production of caesium chloride in a state of high purity which comprises the successive steps of digesting pollucite in an excess of concentrated hydrochloric acid to produce a solution containing caesium chloride and other water-soluble compounds in aqueous hydrochloric acid having a concentration in which caesium antimony chloride can form, reacting the caesium chloride in the solution to form caesium antimony chloride, separating the caesium antimony chloride from the said acidic solution and suspending it in an amount of water which will dissolve the hydrochloric acid released by the decomposition of the caesium antimony chloride without its concentration reaching a level which permits the existence of caesium antimony chloride, permitting the caesium antimony chloride to decompose to form a caesium chloride and a water-insoluble compound of antimony, separating the water-insoluble compound of antimony from the caesium chloride solution, reacting the caesium chloride with perchloric acid to produce caesium perchlorate, separating caesium perchlorate crystals from the solution, and heating the caesium perchlorate to an elevated temperature to cause its decomposition to caesium chloride.

6. A method for the production of caesium chloride in a state of high purity which comprises digesting pulverized pollucite in hydrochloric acid having a concentration within the range of 3 N to about 12 N at a temperature within the range of about 90° C. to about 108° C. for a period within the range of about 8 hours to about 20 hours to produce an impure aqueous solution of caesium chloride, hydrogen chloride and other water-soluble materials which is at least 3 N with respect to the hydrogen chloride, separating this impure aqueous solution from the undissolved residue of the pollucite, reacting the caesium chloride with antimony chloride to produce caesium antimony chloride, separating the caesium antimony chloride from the acidic solution and suspending it in an amount of water which will dissolve hydrogen chloride produced by the decomposition of the caesium antimony chloride without the hydrogen chloride concentration reaching a concentration of 3 N, permitting the caesium antimony chloride to decompose to form caesium chloride and a water-insoluble compound of antimony, separating the water-insoluble antimony compound from the solution of caesium chloride, reacting the caesium chloride with perchloric acid to produce caesium perchlorate, separating crystallized caesium perchlorate from the solution and slowly heating the caesium perchlorate to the melting point of caesium chloride to decompose them to caesium chloride and to melt the caesium chloride.

7. A method for the production of caesium chloride in a state of high purity which comprises the successive steps of forming an impure solution which contains caesium chloride, other water-soluble metallic compounds and hydrochloric acid from a caesium-bearing mineral, extracting this impure solution with isopropyl ether to separate any compounds of iron, thallium and gold which may be contained therein, reacting the caesium chloride in the aqueous solution with antimony chloride to produce a precipitate of caesium antimony chloride, separating the caesium antimony chloride from the impure solution, suspending the caesium antimony chloride in water to cause it to decompose to form caesium chloride and a water-insoluble compound of antimony, removing the antimony compound from the solution of caesium chloride, reacting the caesium chloride with perchloric acid to produce crystals of caesium perchlorate, separating the caesium perchlorate crystals from the said solution, and decomposing the caesium perchlorate to produce caesium chloride of high purity.

8. A method for the production of caesium chloride in a state of high purity which comprises digesting pulverized pollucite in hydrochloric acid having a concentration within the range of 3 N to about 12 N at a temperature within the range of about 90° C. to about 108° C. for a period within the range of about 8 hours to about 20 hours to produce an impure aqueous solution of caesium chloride, hydrogen chloride and other water-soluble materials which is at least 3 N with respect to the hydrogen chloride, separating this impure aqueous solution from the undissolved residue of the pollucite, extracting the solution with isopropyl ether to remove any compounds of iron, thallium and gold contained therein, reacting the caesium chloride with antimony chloride to produce caesium antimony chloride, separating the caesium antimony chloride from the acidic solution and suspending it in an amount of water which will dissolve hydrogen chloride produced by the decomposition of the caesium antimony chloride without the hydrogen chloride concentration reaching a concentration of 3 N, permitting the caesium antimony chloride to decompose to form caesium chloride and a water-insoluble compound of antimony compound from the solution of caesium chloride, reacting the caesium chloride with perchloric acid to produce caesium perchlorate, separating crystallized caesium perchlorate from the solution and slowly heating the caesium perchlorate to the melting point of caesium chloride to decompose them to caesium chloride and to melt the caesium chloride.

9. A method for the production of caesium chloride in a state of high purity which comprises digesting pulverized pollucite in hydrochloric acid having a concentration within the range of 3 N to about 12 N at a temperature within the range of about 90° C. to about 108° C. for a period within the range of about 8 hours to about 20 hours to produce an impure aqueous solution of caesium chloride, hydrogen chloride and other water-soluble materials which is at least 3 N with respect to the hydrogen chloride, separating this impure aqueous solution from the undissolved residue of the pollucite, reacting the caesium chloride with antimony chloride to produce caesium antimony chloride, separating the caesium antimony chloride from the acidic solution and suspending it in an amount of water at a temperature below about 60° C. which will dissolve hydrogen chloride produced by the decomposition of the caesium antimony chloride without the hydrogen chloride concentration reaching a concentration of 3 N, permitting the caesium antimony chloride to decompose to form caesium chloride and a water-insoluble compound of antimony, separating the water-insoluble antimony compound from the solution of caesium chloride, reacting the caesium chloride with perchloric acid to produce caesium perchlorate, separating crystallized caesium perchlorate from the solution and slowly heating the caesium perchlorate to the melting point of caesium chloride to decompose them to caesium chloride and to melt the caesium chloride.

10. A method for the production of caesium chloride in a state of high purity which comprises digesting pulverized pollucite in hydrochloric acid having a concentration within the range of 3 N to about 12 N at a temperature within the range of about 90° C. to about 108°

C. for a period within the range of about 8 hours to about 20 hours to produce an impure aqueous solution of caesium chloride, hydrogen chloride and other water-soluble materials which is at least 3 N with respect to the hydrogen chloride, separating this impure aqueous solution from the undissolved residue of the pollucite, reacting the caesium chloride with antimony chloride to produce caesium antimony chloride, separating the caesium antimony chloride from the acidic solution and suspending it in an amount of water at a temperature above 60° C. which will dissolve hydrogen chloride produced by the decomposition of the caesium antimony chloride without the hydrogen chloride concentration reaching a concentration of 3 N, permitting the caesium antimony chloride to decompose to form caesium chloride and antimony hydroxide, separating the antimony hydroxide from the solution of caesium chloride, reacting the caesium chloride with perchloric acid to produce caesium perchlorate, separating crystallized caesium perchlorate from the solution and slowly heating the caesium perchlorate to the melting point of caesium chloride to decompose them to caesium chloride and to melt the caesium chloride.

References Cited in the file of this patent
UNITED STATES PATENTS 2,481,455    Stenger _____ Sept. 6, 1949

OTHER REFERENCES

J. W. Mellor's "A Comprehensive Treatise on Inorganic and Theoretical Chemistry," vol. 2, 1922 Ed., page 528, Longmans, Green & Co., N. Y.